2,806,021
United States Patent Office
Patented Sept. 10, 1957

1

2,806,021

REACTION OF DECACYCLENE WITH SULFURYL CHLORIDE AND SULFUR AND PRODUCTS OBTAINED THEREBY

Heinrich Ritter, Frankfurt am Main Fechenheim, Germany, assignor to Cassella Farbwerke Mainkur Aktiengesellschaft, Frankfurt am Main Fechenheim, Germany, a company of Germany No Drawing. Application February 21, 1955,
Serial No. 489,747

Claims priority, application Germany March 16, 1954

2 Claims. (Cl. 260—139)

This invention relates to new sulfur dyestuffs and a process for producing same.

In the U. S. patent specification 2,076,144 sulfur dyestuffs are described which are obtained by sulfuration and halogen treatment of decacyclene in the presence of chlorosulfonic acid. These dyestuffs show yellow-brown shades of a quite low fastness to light. Moreover, they can only partially be dissolved with sodium sulfide.

I have now found, surprisingly, that sulfur dyestuffs of deep brown shades, with an oustanding fastness to light and weather and a good solubility in sodium sulfide solution are obtained by chlorinating decacyclene by means of sulfuryl chloride with or without indifferent diluting agents, such as monochlorobenzene, at temperatures up to the boiling point of the sulfuryl chloride in the presence or absence of known chlorination catalysts (such as iron, iron salts, aluminum chloride, iodine or similar agents) and treating the products thus obtained which contain 8–10 atoms of chlorine in the molecule of decacyclene, with sulfur at temperatures above 240° C.

The following example is given for the purpose of illustrating the invention, the parts being by weight and the temperatures in degrees Centigrade.

*Example*

100 parts of decacyclene are stirred slowly into a 15-fold quantity of sulfuryl chloride in which 1 part of iron is suspended, the inner temperature rising slowly from about 20° to about 40°. The chlorination of the decacyclene occurs under strong liberation of hydrogen chloride. The reaction is completed by after-heating the mass for 5–6 hours at 70° until no more hydrogen chloride escapes. Two thirds of the amount applied of sulfuryl chloride are then removed by distillation, and the content of the vessel which is still pasty is decomposed with ice and water and ground in a ball mill. Thereafter, the intensely yellow reaction product is removed by filtering with suction, washed and dried. A chlorination product is obtained which, as an analysis shows, contains 45% of chlorine which corresponds to about 10 atoms of chlorine. At a longer time of action of the sulfuryl chloride and with the use of a greater amount of catalyst there are obtained even higher-chlorinated products.

30 parts of the chlorination product thus obtained from decacyclene are heated with an 8–10 fold amount of sulfur in an autoclave to 250–270° which temperature is maintained for 6–8 hours. After allowing to cool the hard melt is comminuted, ground and freed from sulfur in excess (by extraction with a suitable solvent such as monochlorobenzene, or by alkaline decomposition e. g. heating the ground product with a 20% caustic soda lye for several hours and subsequent precipitation of the dyestuff by means of sodium bisulfite). In this way, a brown powder is obtained after drying, which dissolves in a solution of sodium sulfide with an intensely claret color, cotton therefrom being dyed strong coffee-brown shades of good wet-fastness properties and an outstanding fastness to light and weather. The fastness to light and weather may be further improved by an after-treatment with potassium chromate+copper sulfate.

I claim:

1. The process of producing sulfur dyestuffs which comprises chlorinating decacyclene with sulfuryl chloride at temperatures up to the boiling point of the sulfuryl chloride, isolating products thus obtained which contain 8–10 atoms of chlorine in the decacyclene molecule, and acting on said isolated products with sulfur at temperatures from above 240° C. to 270° C.

2. Sulfur dyestuffs produced by the process of claim 1.

References Cited in the file of this patent
UNITED STATES PATENTS 2,076,143   Hagge et al. _____ Apr. 6, 1937
2,222,482   Hagge et al. _____ Nov. 19, 1940